No. 823,335. PATENTED JUNE 12, 1906.
I. T. HURD.
WAGON WHEEL.
APPLICATION FILED NOV. 16, 1905.
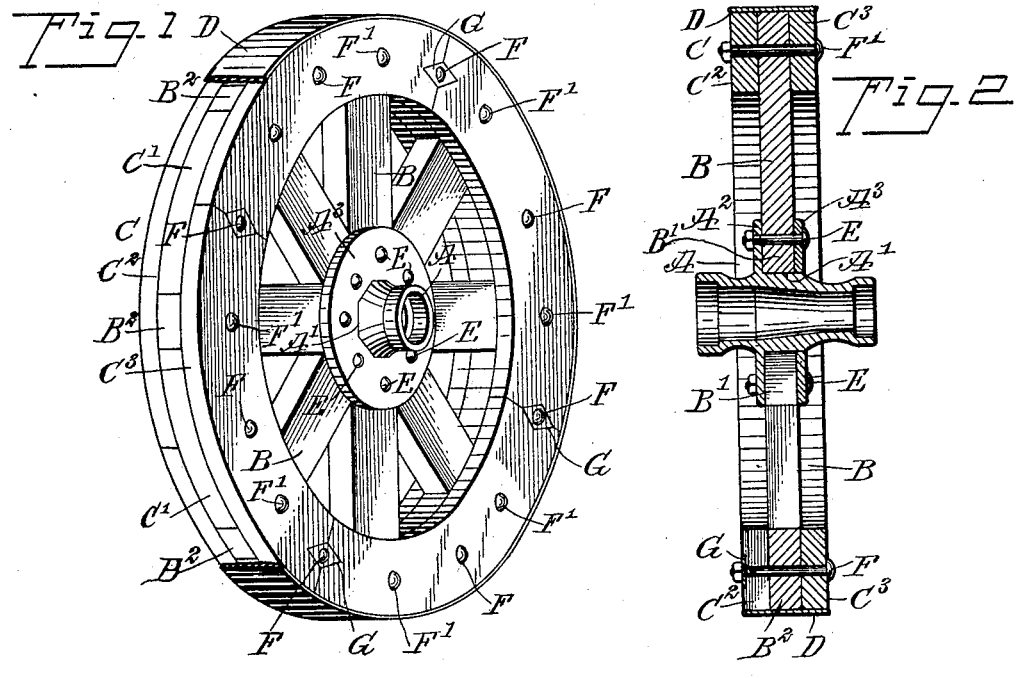
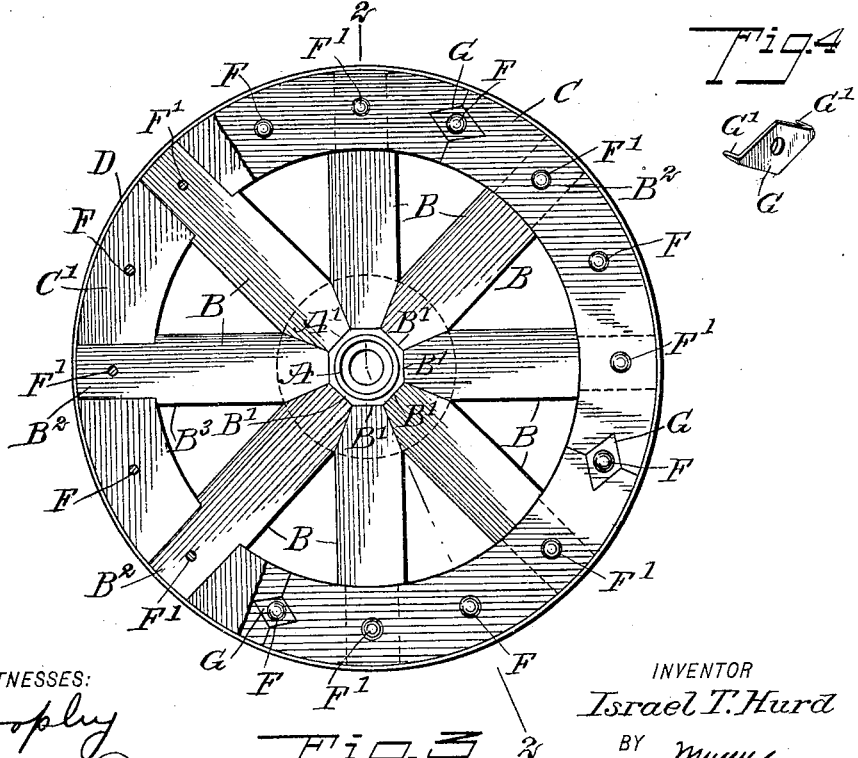
WITNESSES:
INVENTOR
Israel T. Hurd
BY
ATTORNEYS

UNITED STATES PATENT OFFICE.

ISRAEL T. HURD, OF LANSING, MICHIGAN.

WAGON-WHEEL.

No. 823,335.   Specification of Letters Patent.   Patented June 12, 1906.

Application filed November 16, 1905. Serial No. 287,605.

*To all whom it may concern:*

Be it known that I, ISRAEL T. HURD, a citizen of the United States, and a resident of Lansing, in the county of Ingham and State of Michigan, have invented a new and Improved Wagon-Wheel, of which the following is a full, clear, and exact description.

The invention relates to carriages and wagons; and its object is to provide a new and improved wagon-wheel, more especially designed for use on road and farm wagons and arranged to combine strength with durability and to allow forming the wheel of wood with a hub and tire of metal.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, part of the tire being broken out. Fig. 2 is a transverse section of the same on the line 2 2 of Fig. 3. Fig. 3 is a face view of the same, parts being removed and parts broken out; and Fig. 4 is a perspective view of one of the connecting-washers for adjacent felly-sections.

The wheel in its general construction consists of a metallic hub A, wooden spokes B, and a wooden felly C, covered on its peripheral face with the usual metal tire D. The hub A is provided at or near its middle with a polygonal face portion $A'$, each side of the polygon forming a seat for the inner end $B'$ of a spoke B, the said inner end $B'$ having tapering sides fitting the corresponding sides of the inner ends of adjacent spokes to form a solid wooden center around the hub A, which center is seated on the polygonal portion $A'$. The hub A is also provided with an integral flange $A^2$, against which rests the rear face of the solid center formed by the spoke ends $B'$, and the front face of the said solid center is engaged by a ring $A^3$, having its opening polygonal and fitting the polygonal portion $A'$ of the hub A, as plainly shown in Figs. 1 and 2. Bolts E extend transversely through the ring $A^3$, the spokes B, and the flange $A^2$ to securely fasten the several parts together.

The felly C is formed of circular layers $C'$, $C^2$, and $C^3$, of which the circular layer $C'$ is the central one, and the layers $C^2$ and $C^3$ are the outer layers and overlie the faces of the central layer $C'$. Each of the layers $C'$, $C^2$, and $C^3$ is made in segmental sections breaking joints, as plainly indicated in the drawings, the ends of each section of the central layer $C'$ fitting the sides of the outer reduced ends $B^2$ of adjacent spokes B, (see Fig. 1 and the left portion of Fig. 3,) the reduced outer end $B^2$ of each spoke forming shoulders $B^3$ with the main portion of the spoke, so that each section of the central layer C is seated on the shoulders $B^3$ of adjacent spokes. It is understood that the reduced end $B^2$ of a spoke is of the same thickness as the central layer $C'$, so that the outer layers $C^2$ and $C^3$ overlie and fit the rear and front faces of the said reduced ends $B^2$ of the spokes.

The layers $C'$, $C^2$, and $C^3$ are fastened together by the transverse bolts F, and similar bolts $F'$ are employed for fastening the outer layers $C^2$ and $C^3$ to the ends $B^2$ of the spokes. The sections of the outer layers $C^2$ and $C^3$ are connected with each other at their abutting ends by washers G, preferably made of diamond shape and provided with inwardly-extending prongs $G'$, adapted to be driven into the ends of adjacent sections, so as to securely hold the sections together, the washer G also forming a seat for the corresponding head or nut of the bolt F used at the joint. By the arrangement described an exceedingly strong and durable wagon-wheel is provided, capable of withstanding heavy strains in every direction. The grains of the wood of the several layers $C'$, $C^2$, and $C^3$ are parallel with each other to strengthen the felly of the wheel and to render it less liable to split.

Having thus described my invention, I claim as new and desire to secure by Letters Patent—

1. The combination in a wheel with the central and side layers of the rim, of bolts extending through the rim at a point between the sections of the side layers thereof, and washers on said bolts and overlapping the joints between the sections of the outer layers.

2. A wagon-wheel comprising a hub, spokes attached at their inner ends to the said hub, a felly formed of layers made in sections fastened together, the outer ends of the spokes fitting between the adjacent ends of successive sections of the central layer, the sections of the layers breaking joints, transverse bolts for fastening the layers together, sundry of the bolts extending through the joints of the sections of the outer layers, and washers for the bolts passing through the joints, each washer extending across the joint and its ends being provided with inwardly-extending prongs driven into the adjacent sections.

3. A wagon-wheel comprising a hub having a polygonal face portion, an integral flange and a ring, the opening of which corresponds with the said polygonal face portion, spokes having their inner ends abutting against the polygonal face portion, transverse bolts for fastening the flange, spokes and ring together, a felly made of a central layer and outer layers superimposed on opposite faces of the said central layer, bolts for fastening the layers together, and bolts for fastening the outer layers and the outer spoke ends together.

4. A wagon-wheel comprising a hub having a polygonal face portion, an integral flange and a ring, the opening of which corresponds with the said polygonal face portion, spokes having their inner ends abutting against the polygonal face portion, transverse bolts for fastening the flange, spokes and ring together, and a felly made of a central layer and outer layers superimposed on opposite faces of the said central layer, the central layer being made in sections abutting with their ends on the outer ends of the spokes.

5. A wagon-wheel comprising a hub having a polygonal face portion, an integral flange and a ring, the opening of which corresponds with the said polygonal face portion, spokes having their inner ends abutting against the polygonal face portion, transverse bolts for fastening the flange, spokes and ring together, and a felly made of a central layer and outer layers superimposed on opposite faces of the said central layer, the central layer being made in sections abutting with their ends on the outer ends of the spokes, the latter having shoulders for the ends of the said sections to rest on.

6. A wagon-wheel comprising a hub having a polygonal face portion, an integral flange and a ring, the opening of which corresponds with the said polygonal face portion, spokes having their inner ends abutting against the polygonal face portion, transverse bolts for fastening the flange, spokes and ring together, and a felly made of a central layer and outer layers superimposed on opposite faces of the said central layer, the central layer being made in sections abutting with their ends on the outer ends of the spokes, the outer layers being also made in sections, breaking joints with each other and with the sections of the central layer.

7. A wagon-wheel comprising a hub having a polygonal face portion, an integral flange and a ring, the opening of which corresponds with the said polygonal face portion, spokes having their inner ends abutting against the polygonal face portion, transverse bolts for fastening the flange, spokes and ring together, a felly made of a central layer and outer layers superimposed on opposite faces of the said central layer, the central layer being made in sections abutting with their ends on the outer ends of the spokes, the outer layers being also made in sections, breaking joints with each other and with the sections of the central layer, transverse bolts for fastening the layers together, and transverse bolts for fastening the outer layers and the spokes together.

In testimony whereof I have signed my name to this specification in the presence of two subscribing witnesses.

ISRAEL T. HURD.

Witnesses:
  GLENN T. HURD,
  CHARLES E. ROBINSON.